UNITED STATES PATENT OFFICE.

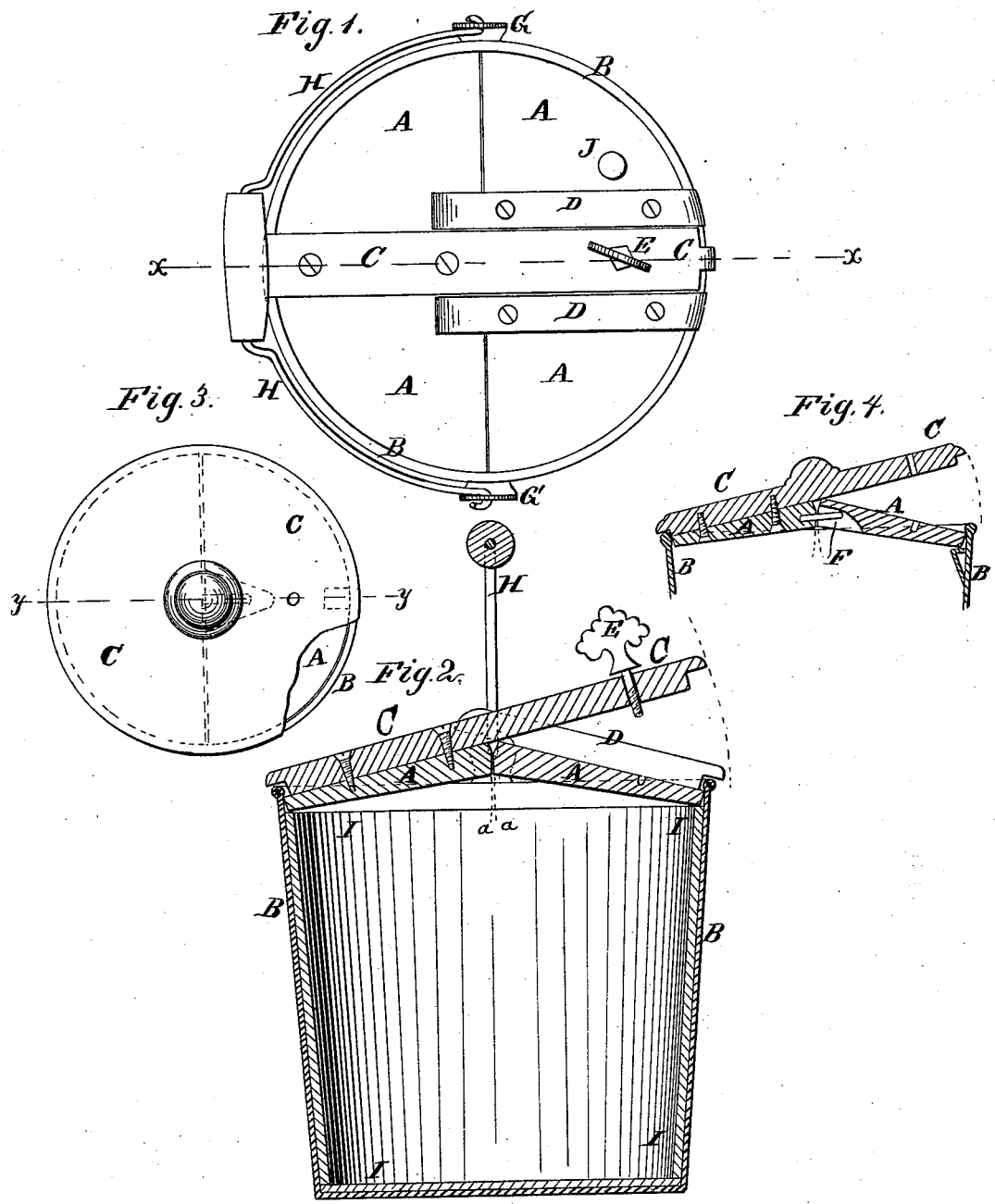

GEORGE J. RECORD, OF CONNEAUT, OHIO.

IMPROVEMENT IN COVERS FOR BUTTER-PACKAGES AND OTHER VESSELS.

Specification forming part of Letters Patent No. 206,261, dated July 23, 1878; application filed June 13, 1878.

*To all whom it may concern:*

Be it known that I, GEORGE J. RECORD, of Conneaut, in the county of Ashtabula and State of Ohio, have invented a new and useful Improvement in Covers for Butter-Packages and other Vessels, of which the following is a specification:

Figure 1 is a top view of my improved cover, shown as applied to a butter-pail. Fig. 2 is a vertical section of the same, taken through the line $x\ x$, Fig. 1, when open. Fig. 3 is a top view of a modified form of the same, part being broken away to show the construction. Fig. 4 is a vertical section of the same, taken through the line $y\ y$, Fig. 3.

Similar letters of reference indicate corresponding parts.

The object of this invention is to furnish an improved cover for butter-packages and other vessels which shall be simple in construction, conveniently and easily applied and removed, and effective in use, closing the package or vessel closely and securely.

The invention consists in a cover formed of the two parts, having their adjacent or straight edges rounded or beveled, and the lever attached to the one part and overlapping the other part, whether the said lever be made narrow in the form of a bar or wide in the form of a circle.

A is the cover, which is made in two parts, having their adjacent or straight edges $a\ a$ beveled or rounded, and of such a size as to fit into the mouth of the vessel B to be covered.

When the vessel B is made of tin it should be a trifle smaller than the cover A, so that the said cover may press it outward with sufficient force to make it hug all parts of the edge of the said cover A, and thus form a very close joint. In this case the parts of the cover A should be thicker toward their straight edges to prevent the edges of the vessel B from being drawn in beneath the said cover, and preventing the cover from being pressed down into place.

To one of the parts of the cover A is attached a lever, C, the rear end of which projects slightly, and is rabbeted to fit upon the edge of the vessel B. The forward end of the lever C is also rabbeted to fit upon the edge of the other side of the vessel B.

To the other part of the cover A, in such positions as to be upon the opposite sides of the lever C, are attached two bars, D, the outer ends of which project slightly, and are rabbeted to rest upon the edge of the vessel B. The bars D are made of such a length that their inner ends may slightly overlap the other part of the cover A, as shown in Figs. 1 and 2.

In applying the cover the middle parts of the curved edges of the two parts of the cover A are placed against the inner surface of the opposite sides of the edge of the vessel B, and their straight edges are placed against each other, as shown in Fig. 2, the projecting ends of the lever C and bars D preventing the said curved edges from dropping down too far. The cover is then pressed down into place by pressing down upon the lever C.

The cover is locked in place by a screw, E, passing in through the free end of the lever C and screwing into the free part of the cover A. If desired, the lever C may be made in the form of a circle, so that its rabbeted edge may rest upon the edge of the vessel B all around, as shown in Figs. 3 and 4. In this case the curved edge of the free part of the cover A may be kept from dropping down too low by a stop attached to the side of the said vessel for the said cover to rest upon, or attached to the said cover to rest upon the edge of the said vessel. In this case, also, the bars D are omitted, and the straight edges of the parts of the cover are kept in line with each other by a pin, F, attached to the edge of the one part and entering a notch in the lower side of the edge of the other part, as shown in Fig. 4. The straight edges of the two parts of the cover A may be kept in line by being hinged to each other, if desired.

The vessel B has ears G attached to its opposite sides to receive the ends of a bail, H, in the manner of an ordinary pail.

When the vessel B is made of tin I prefer to make its body in two pieces seamed to each other, and to attach the ears G to it directly over the two seams, to prevent the said seams from being drawn open by the strain when the cover A is forced down into place. When the vessel B is made of tin, and is designed for a butter-package, it should be lined with a wood veneer, I, to prevent the butter from being affected by heat. The lining I is formed by placing a circle of veneer upon the bottom of the vessel B, and then placing another piece of veneer, cut into the required shape, around the inner surface of the said vessel. Another advantage of the veneer-lining I is that it enables the butter to be easily removed in a mass by inverting the vessel and slightly jarring it.

If desired, a hole may be formed through the cover A, closed by a cork, J, or other suitable means, to admit air, and thus facilitate the removal of the said cover. The hole in the cover A also serves a convenient purpose for introducing brine, without removing the cover, when the dealer wishes to keep the butter for a time in the package. It also enables the trier to be readily introduced for trying the butter.

Having thus described my invention, I claim as new and desire to secure by Letters Patent—

A cover formed of the two parts A, having their adjacent or straight edges beveled or rounded, and the lever C, attached to the one part and overlapping the other part, whether the said lever be made narrow in the form of a bar or wide in the form of a circle, substantially as herein shown and described.

GEORGE JOHN RECORD.

Witnesses:
  JAMES T. GRAHAM,
  C. SEDGWICK.